United States Patent [19]
Milton, Jr.

[11] 3,718,187
[45] Feb. 27, 1973

[54] METHOD OF INJECTION WELL STIMULATION

[75] Inventor: Harry W. Milton, Jr., Findlay, Ohio

[73] Assignee: Marathon Oil Company, Findlay, Ohio

[22] Filed: Feb. 8, 1971

[21] Appl. No.: 113,720

[52] U.S. Cl...............166/274, 166/305 R, 166/295
[51] Int. Cl....................E21b 33/138, E21b 43/22
[58] Field of Search....... 166/273, 274, 270, 292, 294, 166/295

[56] References Cited

UNITED STATES PATENTS

| | | | |
|---|---|---|---|
| 3,474,865 | 10/1969 | Gogarty et al. | 166/274 |
| 3,467,188 | 9/1969 | Gogarty | 166/274 |
| 2,272,672 | 2/1942 | Kennedy | 166/270 |
| 3,193,007 | 7/1965 | Kiel et al. | 166/269 X |
| 3,251,414 | 5/1966 | Willman | 166/269 X |
| 2,402,588 | 6/1946 | Andresen | 166/270 |
| 3,254,714 | 6/1966 | Gogarty et al. | 166/274 |
| 3,506,070 | 4/1970 | Jones | 166/273 |
| 3,482,631 | 12/1969 | Jones | 166/273 |
| 3,174,546 | 3/1965 | Flickinger | 166/269 |

*Primary Examiner*—Stephen J. Novosad
*Attorney*—Joseph C. Herring, Richard C. Wilson, Jr. and Jack L. Hummel

[57] ABSTRACT

Stimulation of injection walls in a heterogeneous reservoir (i.e., characteristically having differing permeability streaks) is improved by temporarily or permanently sealing off the highly permeable streaks with plugging agents and then stimulating the well with a micellar dispersion. This process provides a more uniform profile of the relative permeability of water flowing in the reservoir.

21 Claims, No Drawings

3,718,187

METHOD OF INJECTION WELL STIMULATION

BACKGROUND OF THE INVENTION

1. Field of the Invention

This invention relates to the secondary recovery of petroleum, particularly to an improved method of injection well stimulation. That is, the injectivity index is improved by this invention.

2. Description of the Prior Art

In order to economically effect a good waterflood operation, water should be injected into the reservoir at a high rate and it should flow uniformly, i.e., without fingering, throughout the reservoir. In a heterogeneous reservoir, characteristic of highly permeable streaks, the water will tend to flow through the streaks creating a fingering effect. Unless these streaks are plugged, a large portion of the reservoir oil will be left in place.

The water injection rate is limited by the high pressure drop in the reservoir immediately surrounding the wellbore. This pressure drop is due to "skin damage", residual oil saturation in this area, etc. By displacing this oil and removing the skin damage, water injection rates can be increased.

U. S. Pat. No. 3,443,640 to Klein teaches selective plugging of a subsurface formation using a solution of minute solid particles and a dispersing surfactant. The solution is injected into the permeability streaks and allowed to settle, permitting the solid particles to precipitate from the solution.

U. S. Pat. No. 3,039,529 to McKennon teaches the use of partially hydrolyzed acrylamide polymers as viscosity increasing agents in the secondary recovery of petroleum.

U. S. Pats. Nos. 3,467,188 and 3,474,865 to Gogarty teach the use of micellar dispersions to increase the injectivity index of an injection well. These dispersions reduce the residual hydrocarbon saturation in the sand pores immediately adjacent the wellbore and remove the skin damage from the face of the wellbore.

SUMMARY OF THE INVENTION

Applicant has developed a process whereby crude oil is economically and efficiently produced from a heterogeneous subterranean oil-bearing formation. This process comprises injecting into the formation plugging agents, which penetrate zones of high permeability, and then injecting a micellar dispersion into the formation immediately surrounding the wellbore. The plugging agents and the micellar dispersion may be injected separately or in the same slug. As a result, a more uniform profile of the reservoir rock or formation will be stimulated, and the reservoir will be more receptive to high water injection rates. A larger volume of crude oil will therefore be produced from a production means as a result of increased injectivity indexes of the injection wells.

DESCRIPTION OF THE PREFERRED EMBODIMENTS

The term "permeability streak", as used in this invention, is a channel created by either a fracture network or a zone of high permeability. A high permeability zone in this respect is often referred to as a matrix.

Plugging agents which can be used in conjunction with this invention include finely-powdered solids, such as cement, colloidal clays, and wax distillates mixed with water; various forms of plastics; gel-forming mixtures of silicic acid; mixtures of urea formaldehyde resin; and others. (See "Selective Plugging by Chemical Methods" by Dr. H. C. Lawton, The Oil Weekly, May 19, 1947); (also see "New Matrix Sealing and Fluid Diversion Systems Find Application in Both Injection and Producing Wells" by J. P. Morgan et al., The Journal of Canadian Petroleum Technology, April to June, 1967.)

Preferably the plugging agents are high molecular weight, synthetic organic polymers. Specific examples of these polymers include polyacrylamides; polysaccharides; polyalkane oxides; partially hydrolyzed polyacrylamides and their derivatives, including acrylamides which have been substituted with functional groups such as sulfonate groups, phosphate groups, and the like. Also, partially hydrolyzed copolymers of polyacrylamides and their derivatives, e.g., copolymers with vinyl sulfonates, vinyl phosphates, and vinyl acrylides; and derivatives of polysaccharides, e.g., carboxymethyl cellulose and cellulose derivatives, dextran, starch derivatives, etc. are useful. Molecular weights of the above-named polymers can range from about $10^4 - 10^8$ or more, depending upon the specific characteristics of the permeability streaks to be plugged.

The mobility of the above-named polymers may be varied by blending with water. Preferably fresh water or brackish water should be used as the solute; the brackish water can be used to increase the mobility of certain polymers, if desired.

About 0.1 – 50 or more barrels of plugging agent per vertical foot of oil-bearing sand is useful to plug the permeability streaks. Preferably, about 1 – 25 barrels are sufficient.

The micellar dispersion used in this invention may be characterized as either oil-external or water-external. Examples of such dispersions can be found in U. S. Pat. Nos. 3,467,188 and 3,474,865 to Gogarty and Gogarty et al. respectively.

The micellar dispersion contains hydrocarbon, aqueous medium, surfactant sufficient to impart micellar characteristics to the hydrocarbon and aqueous medium, and optionally cosurfactant(s) and/or electrolyte(s). Examples of volume amounts include about 1 to about 85 percent hydrocarbon, about 5 to about 95 percent aqueous medium, at least about 4 percent surfactant, about 0.01 to about 20 percent cosurfactant, and about 0.001 to about 4 percent by weight of the electrolyte. Also, the micellar dispersion can contain other additives such as corrosion inhibiting agent, bactericides, etc. Examples of the hydrocarbon, aqueous medium, surfactant, the cosurfactant, and the electrolyte are found in U. S. Pat. Nos. 3,254,714 and 3,275,075 to Gogarty et al.; 3,497,006 to Jones et al.; and U.S. Pat. Nos. 3,470,958 and 3,467,194 to Kinney.

The mobility of the oil-external micellar dispersion can be about equal to or greater than the mobility of the formation fluids (i.e., combination of oil and water within the formation).

The amount of micellar dispersion injected into the formation preferably is about 0.01 to about 10 barrels and more preferably about 0.1 to about 5 barrels per vertical foot of oil-bearing sand.

The micellar dispersion is preferably injected at a pressure less than the formation fracture pressure. After the dispersion is injected into the formation, it can remain in contact with the area immediately adjacent the wellbore for times up to about 6 hours and more preferably for about 12 hours. Such contact times insure a more complete solubilization of the residual oil, etc., allowing for better cleansing of the porous rock.

Optionally, the plugging agents and the micellar dispersion may be injected into the formation separately or in the same slug. When the two components are injected in the same slug, the plugging agents comprise the front portion, about 1 – 50 percent by volume, while the micellar dispersion comprises the remainder of the slug.

The wellbore in fluid communication with the subterranean formation may be either cased or uncased. If the wellbore is cased, "sealer balls", known in the fracturing art, may be used to effect an improved profile by injecting the sealer balls intermittently with the plugging agent.

It should be understood that the invention is capable of a variety of modifications and variations which will be made apparent to those skilled in the art by a reading of the specification and which are to be included within the spirit of the specification and appended claims.

What is claimed is:

1. A process for improving the injectivity index of an injection well in fluid communication with an oil-bearing, heterogeneous, subterranean formation having highly permeable streaks immediately adjacent said injection means, the process comprising:
    a. injecting into the formation an aqueous solution containing a plugging agent in an amount sufficient to effectively "plug" the highly permeable streaks in the formation, then
    b. injecting into the formation about 0.01 to about 10 barrels of a micellar dispersion per vertical foot of oil-bearing formation, and
    c. displacing the micellar dispersion out into the formation by injecting water.

2. The process of claim 1 wherein said injection means is a cased wellbore.

3. The process of claim 1 wherein said injection means is an uncased wellbore.

4. The process of claim 1 wherein about 0.1 to about 50 barrels per vertical foot of oil-bearing formation of the aqueous solution containing the plugging agent is injected into the formation.

5. The process of claim 1 wherein said micellar dispersion is characterized as water-external.

6. The process of claim 1 wherein said micellar dispersion is characterized as oil-external.

7. The process of claim 1 wherein the micellar dispersion is comprised of hydrocarbon, aqueous medium and surfactant.

8. The process of claim 1 wherein the plugging agent is a high molecular weight, synthetic organic polymer.

9. The process of claim 8 wherein the organic polymer is a polyacrylamide, a partially hydrolyzed polyacrylamide or a derivative thereof, a partially hydrolyzed copolymer or a polyacrylamide or a derivative thereof or a combination thereof.

10. The process of claim 1 wherein the micellar dispersion is comprised of about 1 to about 85 percent by volume hydrocarbon, about 5 to about 95 percent by volume of aqueous medium, and at least about 4 percent by volume of surfactant.

11. A process for recovering crude oil from an oil-bearing subterranean heterogeneous formation having at least one injection means in fluid communication with at least one production means and wherein the formation has highly permeable streaks immediately adjacent said injection means, the process comprising:
    a. injecting into the formation about 0.01 to about 10 barrels of a micellar dispersion per vertical foot of oil-bearing formation, the front portion of the micellar dispersion containing a plugging agent in amounts sufficient to effectively "plug" the highly permeable streaks in the formation, and
    b. displacing this micellar dispersion toward the production means to recover crude oil therethrough.

12. The process of claim 11 wherein the plugging agent in the front portion of the micellar dispersion represents about 1 to about 50% by volume of the dispersion.

13. The process of claim 11 wherein said injection means is a cased wellbore.

14. The process of claim 11 wherein said injection means is an uncased wellbore.

15. The process of claim 11 wherein the micellar dispersion is characterized as being water-external.

16. The process of claim 11 wherein the micellar dispersion is characterized as being oil-external.

17. The process of claim 11 wherein the micellar dispersion is displaced toward the production means with water.

18. The process of claim 11 wherein the micellar dispersion is comprised of hydrocarbon, aqueous medium and surfactant.

19. The process of claim 11 wherein the plugging agent is a high molecular weight, synthetic organic polymer.

20. The process of claim 19 wherein the organic polymer is a polyacrylamide, a partially hydrolyzed polyacrylamide or a derivative thereof, a partially hydrolyzed copolymer of polyacrylamide or a derivative thereof or a combination thereof.

21. The process of claim 11 wherein the micellar dispersion is comprised of about 1 to about 85 percent by volume hydrocarbon, about 5 to about 95 percent by volume of aqueous medium, and at least about 4 percent by volume of surfactant.

* * * * *